No. 859,236. PATENTED JULY 9, 1907.
C. MAIER & F. SANFORD.
AIR BRAKE HOSE COUPLING.
APPLICATION FILED AUG. 30, 1906.
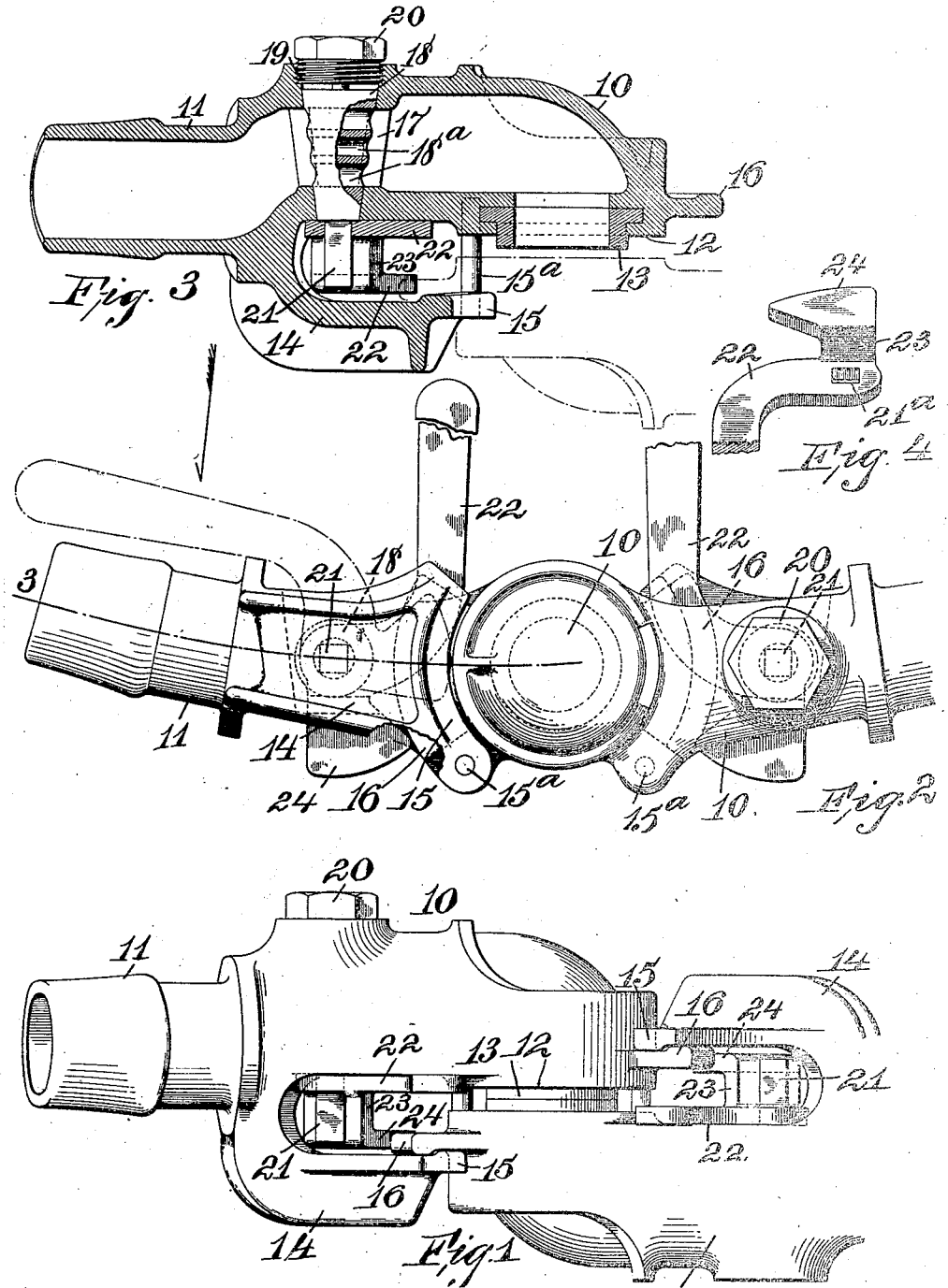

UNITED STATES PATENT OFFICE.

CHARLES MAIER, OF NEWARK, AND FRANK SANFORD, OF JERSEY CITY, NEW JERSEY.

AIR-BRAKE-HOSE COUPLING.

No. 859,236.

Specification of Letters Patent.

Patented July 9, 1907.

Application filed August 30, 1906. Serial No. 332,566.

*To all whom it may concern:*

Be it known that we, CHARLES MAIER and FRANK SANFORD, citizens of the United States, residing at Newark and Jersey City, respectively, in the counties of Essex and Hudson and State of New Jersey, have invented certain new and useful Improvements in Air-Brake-Hose Couplings; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention relates to improvements in couplings which are adapted to connect meeting ends of hose or pipe sections, and while our invention is applicable to any meeting pipes or hose, where a quick and air tight union is required, it is especially intended for use in connection with the short hose connecting the air pipes of meeting railway cars, and in connection with the usual air brake system.

In air brake systems it is customary to have a swinging hose section at the end of the main air pipe and beneath the car platform, which swinging section has a coupling at its end adapted to connect with a similar coupling on an opposed hose section. When the cars are uncoupled and separated, the operator has usually to turn a valve at the end of each pipe beneath the car before uncoupling the hose sections, and he has also to operate the valve after uniting the couplings, in case the cars are being coupled together.

The object of our invention is to obviate this difficulty and produce a simple form of coupling in which the valve is combined with the coupling piece, so that when the hose sections are pushed together the valve will be thereby automatically operated to open the connection between the two pipes, and further, to construct the device so that when uncoupled, the operator can grasp the valve handles by the same motion he uses in uncoupling the hose sections, and will thereby close the valves or cocks.

Our invention is further intended to make this structure of valve and coupling as simple as possible, to the end that it may be inexpensive, and that it will operate satisfactorily, and without getting out of order.

Reference is to be had to the accompanying drawings, forming a part of this specification, in which similar letters and figures of reference indicate corresponding parts in all the figures.

Figure 1 is a broken plan view of a complete coupling showing the two sections united. Fig. 2 is a side elevation of the same. Fig. 3 is a section on the line 3—3 of Fig. 2, showing one of the coupling sections in detail, and with the cock broken away in part, and Fig. 4 is a broken detail of the valve lever.

In general the coupling sections are of the same appearance and shape as the ordinary couplings for air brake systems, and each section comprises the body portion 10, having a shank 11 for connection with the hose, the flat face 12 with the opening therein to meet the corresponding part of the opposed section, the gasket 13 held in the face 12, the arm 14 extending forward generally parallel with the body portion 10, the lips 15 and 16 on the protruding end portions of the body 10 and arm 14, and the stop pins 15$^a$. All the above is substantially as in the usual couplings and is not claimed as a part of this invention. At the point between the shank 11 and body portion 10 is a way 17 and traversing this is a tapering cock or valve 18 having openings 18$^a$ therethrough, and this valve or cock has its larger end engaged by the portion 19 of the nut 20, while from the tapering end extends a stem 21 which is squared so as to fit snugly in the opening 21$^a$ of the bent hand lever 22.

The particular form of cock is well adapted to the use intended, as it can be fitted with a ground joint and will be very tight, while the holes 18$^a$ can be easily bored and afford a sufficient passage for air. We do not, however, limit our invention to this form of cock or valve, but claim any valve which will operate in the manner herein set forth.

The lever 22 is curved so that it can be tipped back parallel with the shank 11 as shown by dotted lines in Fig. 2, or it can be extended out at right angles to the body 10, as shown by full lines in the same figure.
The hand lever has an offset 23 and terminates in a striking plate or end 24, which lies in the path of the lip 16 of an opposed coupling piece or section. It will be seen, therefore, that when the cocks or valves 18 are closed, and the handles or levers 22 lie as shown by dotted lines in Fig. 2, the act of bringing the two couplings together will cause the lips 16 to strike the ends or plates 24 and turn the levers or handles to the position shown by full lines in Fig. 2, thereby opening the cocks and connecting the pipes beneath the car, while if the sections are to be uncoupled, the operator simply grasps the handles 22 and the coupling pieces 10, and tips the handles back to the position first referred to, thereby closing the cocks by the same motion, practically, that he uses in uncoupling the sections, and in any event, he is not obliged to operate any other cocks, as is usually the case.

It will be readily seen that the meeting parts and the form of valve or cock might be changed so that the above operation can be carried out, and we therefore do not limit our invention to the precise construction shown, though this, in our opinion, is best suited for the purpose.

Having thus fully described our invention, we claim as new and desire to secure by Letters Patent,—
1. The combination with the coupling section of a train pipe, of a valve arranged therein and controlling the opening therethrough, and a hand lever connected to the stem of the valve, said lever having one part extending into the path of an opposed coupling section and adapted to be operated thereby and another part projecting outward where it can be grasped.

2. A coupling for a train pipe comprising a body portion, a valve controlling the opening therethrough, a hand lever on the stem of the valve having a striking plate extending into the path of an opposed coupling section to be locked thereby to open the valve when the couplings are joined, the hand lever having a part for manual operation, and arranged to project transversely from the casing when the valve is open.

3. A coupling comprising a body portion, a valve to control the opening therethrough, a hand lever on the valve stem having a hand portion to project transversely from the body portion when the valve is open, and to lie against the body portion when the valve is shut, and a striking plate on the hand lever to be actuated and locked by an opposed coupling to open the valve when the couplings are joined.

In testimony, that we claim the foregoing, we have hereunto set our hands this 27th day of August 1906.

CHARLES MAIER.
FRANK SANFORD.

Witnesses:
WM. H. CAMFIELD,
RALPH LANCASTER.